US012798392B2

(12) United States Patent
Takahashi

(10) Patent No.: US 12,798,392 B2
(45) Date of Patent: Nov. 17, 2026

(54) POWER SUPPLY SYSTEM

(71) Applicant: HONDA MOTOR CO., LTD., Tokyo (JP)

(72) Inventor: Masaya Takahashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/268,590

(22) Filed: Jul. 14, 2025

(65) Prior Publication Data

US 2026/0021709 A1 Jan. 22, 2026

(30) Foreign Application Priority Data

Jul. 16, 2024 (JP) ................................ 2024-113261

(51) Int. Cl.

| | |
|---|---|
| ***B60L 15/00*** | (2006.01) |
| ***B60L 15/04*** | (2006.01) |
| ***B60L 15/20*** | (2006.01) |
| ***B60L 15/22*** | (2006.01) |
| ***H02J 1/08*** | (2026.01) |

(52) U.S. Cl.

CPC ............ *B60L 15/007* (2013.01); *B60L 15/04* (2013.01); *B60L 15/2072* (2013.01); *B60L 15/22* (2013.01); *H02J 1/086* (2020.01); *B60L 2210/10* (2013.01)

(58) Field of Classification Search

CPC .... B60L 15/007; B60L 15/04; B60L 15/2072; B60L 15/22; B60L 2210/10; H02J 1/086

See application file for complete search history.

(56) References Cited

U.S. PATENT DOCUMENTS

| | | | | |
|---|---|---|---|---|
| 2020/0112260 | A1 | 4/2020 | Suzuki et al. | |
| 2020/0313457 | A1* | 10/2020 | Kozuki | H02J 7/1423 |
| 2022/0302726 | A1* | 9/2022 | Matsumoto | H02J 1/10 |
| 2022/0355705 | A1* | 11/2022 | Kwon | B60L 50/60 |
| 2023/0104265 | A1* | 4/2023 | Morita | H02J 9/061 307/23 |
| 2023/0198290 | A1* | 6/2023 | Kobayashi | H02J 1/10 307/23 |

FOREIGN PATENT DOCUMENTS

| | | |
|---|---|---|
| JP | 2020-061807 A | 4/2020 |
| JP | 2023-032346 A | 3/2023 |

* cited by examiner

*Primary Examiner* — Regis J Betsch
*Assistant Examiner* — Alex W Lam
(74) *Attorney, Agent, or Firm* — Paratus Law Group, PLLC

(57) ABSTRACT

In a non-started-up state of a vehicle, a first power conversion circuit operates to convert a voltage of a second level from a second power supply into a voltage of a third level, a first and a second switches are each controlled to a connection state, the voltage of the second level from the second power supply is supplied to a first load and the first power conversion circuit, the voltage of the second level from the second power supply is supplied to a second load via the first switch, the voltage of the third level from the first power conversion circuit is supplied to the first load, and the voltage of the third level from the first power conversion circuit is supplied to the second load via the second switch.

8 Claims, 15 Drawing Sheets

FIRST MODE

SECOND MODE

THIRD MODE

POWER SUPPLY SYSTEM

This application is based upon and claims the benefit of priority from prior Japanese patent application No. 2024-113261, filed on Jul. 16, 2024, the entire contents of which are incorporated herein by reference.

TECHNICAL FIELD

The present disclosure relates to a power supply system to be mounted on a vehicle.

BACKGROUND ART

In recent years, improvement in traffic safety has been required in order to enable inclusion, safety, toughness, and sustainability of urban and human residents. In a vehicle, from the viewpoint of improving traffic safety, for example, it is required to ensure the traffic safety even when an abnormality occurs in the vehicle.

JP2023-32346A describes a vehicle power supply system including a main power supply system including a normal load group and an auxiliary machine power supply, a backup power supply system including a backup load group, and a high-voltage power supply that outputs power having a voltage higher than that of the auxiliary machine power supply, in which the main power supply system is connected to the high-voltage power supply via a first DC/DC converter, the backup power supply system is connected to the high-voltage power supply in parallel with the main power supply system via a second DC/DC converter, and the vehicle power supply system further includes a connection line that connects the main power supply system and the backup power supply system.

JP2020-61807A describes a power conversion device including a main DC/DC converter that performs voltage conversion between a first voltage unit and a second voltage unit, and a power conversion unit connected to the first voltage unit, in which the power conversion unit includes a power conversion part that performs power conversion between the first voltage unit and a third voltage unit, and a sub DC/DC converter that shares at least a part of the power conversion part with the power conversion part as a shared component, and the sub DC/DC converter is connected in parallel with the main DC/DC converter.

SUMMARY OF INVENTION

Aspects of the present disclosure relate to providing a power supply system for a vehicle capable of reducing manufacturing costs.

According to an aspect of the present disclosure, there is provided a power supply system including:

a first power conversion circuit; and a second power conversion circuit, the first power conversion circuit and the second power conversion circuit being connected in parallel to a first power supply that is mounted on a vehicle and that outputs a voltage of a first level, in which each of the first power conversion circuit and the second power conversion circuit is capable of converting a voltage of the first level into a voltage of a second level and a voltage of a third level, and converting a voltage of the second level into a voltage of the third level, the voltage of the second level and the voltage of the third level output from the first power conversion circuit are capable of being supplied to a first load of the vehicle, the voltage of the second level and the voltage of the third level output from the second power conversion circuit are capable of being supplied to a second load of the vehicle, the power supply system further includes:

a first switch configured to switch between connection and cutoff between a first power supply line connecting the first power conversion circuit and the first load and a second power supply line connecting the second power conversion circuit and the second load, the first power supply line and the second power supply line being power supply lines to be supplied with a voltage of the second level;

a second switch configured to switch between connection and cutoff between a third power supply line connecting the first power conversion circuit and the first load and a fourth power supply line connecting the second power conversion circuit and the second load, the third power supply line and the fourth power supply line being power supply lines to be supplied with a voltage of the third level; and a second power supply connected to the first power supply line and configured to output a voltage of the second level, in a non-started-up state of the vehicle, the first power conversion circuit operates in a first mode in which the voltage of the second level supplied from the second power supply is converted into a voltage of the third level, the first switch and the second switch are each controlled to a connection state, the voltage of the second level output from the second power supply is supplied to the first load and the first power conversion circuit, the voltage of the second level output from the second power supply is supplied to the second load via the first switch, the voltage of the third level output from the first power conversion circuit is supplied to the first load, and the voltage of the third level output from the first power conversion circuit is supplied to the second load via the second switch.

According to the present disclosure, it is possible to provide a power supply system for a vehicle capable of reducing manufacturing costs.

BRIEF DESCRIPTION OF DRAWINGS

Exemplary embodiment(s) of the present invention will be described in detail based on the following figures, wherein.

DESCRIPTION OF EMBODIMENTS

Figure 1:
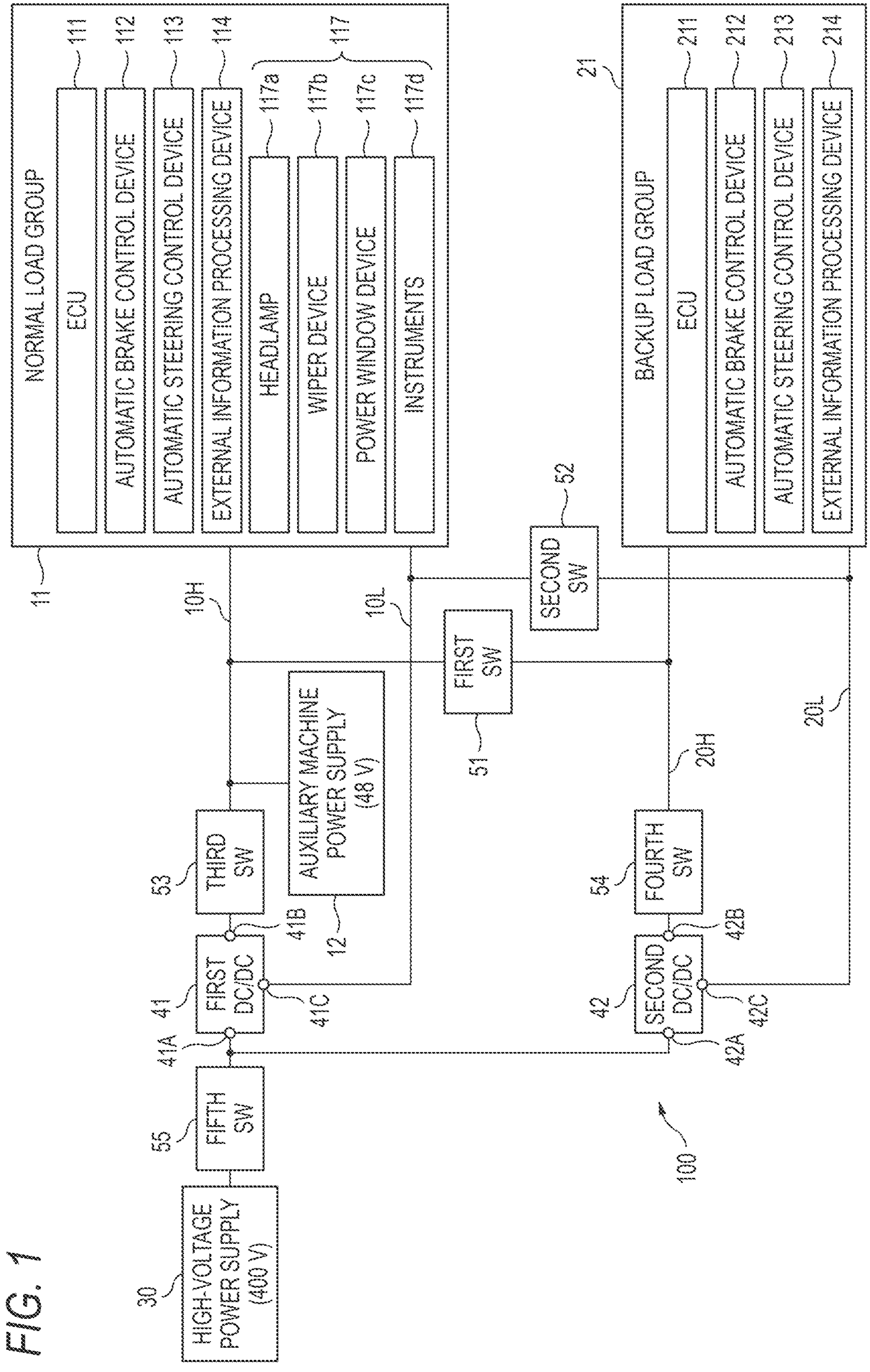
FIG. 1 is a schematic diagram showing a schematic configuration of a power supply system 100.

Hereinafter, a power supply system 100 for a vehicle according to an embodiment of the present disclosure will be described with reference to the accompanying drawings. The drawings are viewed from directions of reference numerals. FIG. 1 is a schematic diagram illustrating a schematic configuration of the power supply system 100.

The power supply system 100 is mounted on a vehicle such as an automobile. The vehicle is provided with a high-voltage power supply 30 capable of outputting a voltage of a first level L1 (for example, 400 [V] or 800 [V]), a normal load group 11, and a backup load group 21. The high-voltage power supply 30 supplies electric power to a motor that drives wheels of the vehicle and supplies electric power to the normal load group 11 and the backup load group 21. The high-voltage power supply 30 includes a secondary battery such as a lithium-ion battery or an all-solid-state battery.

The normal load group 11 includes loads having functions related to a traveling operation, a stopping operation, or driving control of the vehicle. For example, the normal load group 11 includes at least one of an auxiliary machine load used for the driving control of the vehicle such as an electronic control unit (ECU); an auxiliary machine load used for braking the vehicle such as an automatic brake device; an auxiliary machine load used for steering the vehicle such as an automatic steering device; and an auxiliary machine load used for acquiring external information of the vehicle such as light detection and ranging (LiDAR) or an imaging device.

In the present embodiment, the normal load group 11 includes an ECU 111 used for the driving control of the vehicle; an automatic brake control device 112 that controls a braking device used for braking the vehicle; an automatic steering control device 113 that controls a steering device used for steering the vehicle; and an external information processing device 114 that processes input information from the LiDAR or the imaging device used for acquiring the external information of the vehicle.

Further, the normal load group 11 includes an auxiliary machine load 117 which is an auxiliary machine load other than the auxiliary machine load used for the driving control of the vehicle, the auxiliary machine load used for braking the vehicle, the auxiliary machine load used for steering the vehicle, and the auxiliary machine load used for acquiring the external information of the vehicle. Examples of the auxiliary machine load 117 include a headlamp, a wiper device, a power window device, and instruments. In the present embodiment, the auxiliary machine load 117 includes a headlamp 117*a*, a wiper device 117*b*, a power window device 117*c*, and instruments 117*d*. The auxiliary machine load 117 may include hardware for wirelessly operating a door lock of the vehicle, hardware related to an anti-theft system of the vehicle, hardware for monitoring surroundings of the vehicle such as a drive recorder, hardware for connecting to a network such as a mobile phone network, and the like. When the vehicle includes an engine, the normal load group 11 may include a starter motor that starts the engine.

The backup load group 21 includes loads having functions related to the traveling operation, the stopping operation, or the driving control of the vehicle. The backup load group 21 includes a load having a function related to execution of a minimal risk maneuver (MRM) which is a minimum traveling operation, stopping operation, and driving control for safely moving the vehicle to a road shoulder of a road and stopping the vehicle even when an abnormality occurs in the power supply system 100. The backup load group 21 includes at least one of an auxiliary machine load used for the driving control of the vehicle such as an ECU; an auxiliary machine load used for braking the vehicle such as an automatic brake device; an auxiliary machine load used for steering the vehicle such as an automatic steering device; and an auxiliary machine load used for acquiring external information of the vehicle such as LiDAR or an imaging device.

In the present embodiment, the backup load group 21 includes an ECU 211 used for the driving control of the vehicle; an automatic brake control device 212 that controls the braking device used for braking the vehicle; an automatic steering control device 213 that controls the steering device used for steering the vehicle; and an external information processing device 214 that processes the input information from the LiDAR or the imaging device used for acquiring the external information of the vehicle.

A part of the loads in the backup load group 21 have functions partially overlapping those in the normal load group 11. In the present embodiment, the ECU 211 in the backup load group 21 has the same function as the ECU 111 in the normal load group 11, the automatic brake control device 212 in the backup load group 21 has the same function as the automatic brake control device 112 in the normal load group 11, the automatic steering control device 213 in the backup load group 21 has the same function as the automatic steering control device 113 in the normal load group 11, and the external information processing device

214 in the backup load group 21 has the same function as the external information processing device 114 in the normal load group 11.

In this way, by making the backup load group 21 partially overlap in function with the normal load group 11, even when an abnormality occurs in the power supply system 100, it is possible to multiplex and make redundant the functions related to the execution of the MRM, which is the minimum necessary traveling operation, stopping operation, and driving control for safely moving the vehicle to the shoulder of the road and stopping the vehicle. Therefore, even when an abnormality occurs in the power supply system 100 and one of the normal load group 11 and the backup load group 21 does not function, the MRM can be executed by the other. Thus, traffic safety can be ensured.

Each of the normal load group 11 and the backup load group 21 includes a high-voltage load that operates with a voltage of a second level L2 (for example, 48 V) lower than the first level L1 as a power supply voltage, and a low-voltage load that operates with a voltage of a third level L3 (for example, 12 V) lower than the second level L2 as a power supply voltage.

The power supply system 100 includes a first DC/DC converter 41 and a second DC/DC converter 42 connected in parallel to the high-voltage power supply 30, an auxiliary machine power supply 12 capable of outputting a voltage of the second level L2, a first switch 51, a second switch 52, a third switch 53, a fourth switch 54, and a fifth switch 55. The auxiliary machine power supply 12 includes a secondary battery such as a lithium-ion battery or an all-solid-state battery. The auxiliary machine power supply 12 may be implemented by a capacitor.

Each of the first DC/DC converter 41 and the second DC/DC converter 42 is configured to convert a voltage of the first level L1 into a voltage of the second level L2 and a voltage of the third level L3 and to convert a voltage of the second level L2 into a voltage of the third level L3. Each of the first DC/DC converter 41 and the second DC/DC converter 42 may be configured to convert a voltage of the second level L2 into a voltage of the first level L1.

An input and output terminal 41A for a voltage of the first level L1 in the first DC/DC converter 41 is connected to one end of the fifth switch 55. The other end of the fifth switch 55 is connected to the high-voltage power supply 30.

One end of a high-voltage power supply line 10H is connected to an input and output terminal 41B of the first DC/DC converter 41 for a voltage of the second level L2. A high-voltage load in the normal load group 11 is connected in parallel to the other end of the high-voltage power supply line 10H.

In the high-voltage power supply line 10H, the third switch 53 is provided between the input and output terminal 41B of the first DC/DC converter 41 and the normal load group 11. One end of the third switch 53 is connected to the input and output terminal 41B, and the other end of the third switch 53 is connected to the high-voltage load in the normal load group 11. In the high-voltage power supply line 10H, the auxiliary machine power supply 12 is connected between the other end of the third switch 53 and the high-voltage load in the normal load group 11.

One end of a low-voltage power supply line 10L is connected to an input and output terminal 41C of the first DC/DC converter 41 for a voltage of the third level L3. A low-voltage load in the normal load group 11 is connected in parallel to the other end of the low-voltage power supply line 10L.

An input and output terminal 42A of the second DC/DC converter 42 for a voltage of the first level L1 is connected to the one end of the fifth switch 55. One end of a high-voltage power supply line 20H is connected to an input and output terminal 42B of the second DC/DC converter 42 for a voltage of the second level L2. A high-voltage load in the backup load group 21 is connected in parallel to the other end of the high-voltage power supply line 20H.

In the high-voltage power supply line 20H, the fourth switch 54 is provided between the input and output terminal 42B of the second DC/DC converter 42 and the backup load group 21. One end of the fourth switch 54 is connected to the input and output terminal 42B, and the other end of the fourth switch 54 is connected to the high-voltage load in the backup load group 21.

One end of a low-voltage power supply line 20L is connected to an input and output terminal 42C of the second DC/DC converter 42 for a voltage of the third level L3. A low-voltage load in the backup load group 21 is connected in parallel to the other end of the low-voltage power supply line 20L.

The first switch 51 has one end connected to the high-voltage power supply line 10H and the other end connected to the high-voltage power supply line 20H, and is configured to switch between electrical connection and cutoff between the high-voltage power supply line 10H and the high-voltage power supply line 20H.

The second switch 52 has one end connected to the low-voltage power supply line 10L and the other end connected to the low-voltage power supply line 20L, and is configured to switch between electrical connection and cutoff between the low-voltage power supply line 10L and the low-voltage power supply line 20L.

Each of the first switch 51 to the fifth switch 55 is implemented by a switching element such as a metal-oxide-semiconductor field-effect transistor (MOSFET), an insulated-gate bipolar transistor (IGBT), or a diode having a switching function. Each of the first switch 51 to the fifth switch 55 is configured to receive a power supply voltage from the auxiliary machine power supply 12, for example. The switch in the present embodiment is described as one whose one end and the other end are electrically connected in an ON state (connection state) and whose one end and the other end are electrically cut off in an OFF state (cutoff state).

The first DC/DC converter 41, the second DC/DC converter 42, and the first switch 51 to the fifth switch 55 are controlled by, for example, the ECU 111 in the normal load group 11 and the ECU 211 in the backup load group 21. The first DC/DC converter 41, the second DC/DC converter 42, and the first switch 51 to the fifth switch 55 may be controlled by a control device other than the ECU 111 in the normal load group 11 and the ECU 211 in the backup load group 21.

Figure 2:
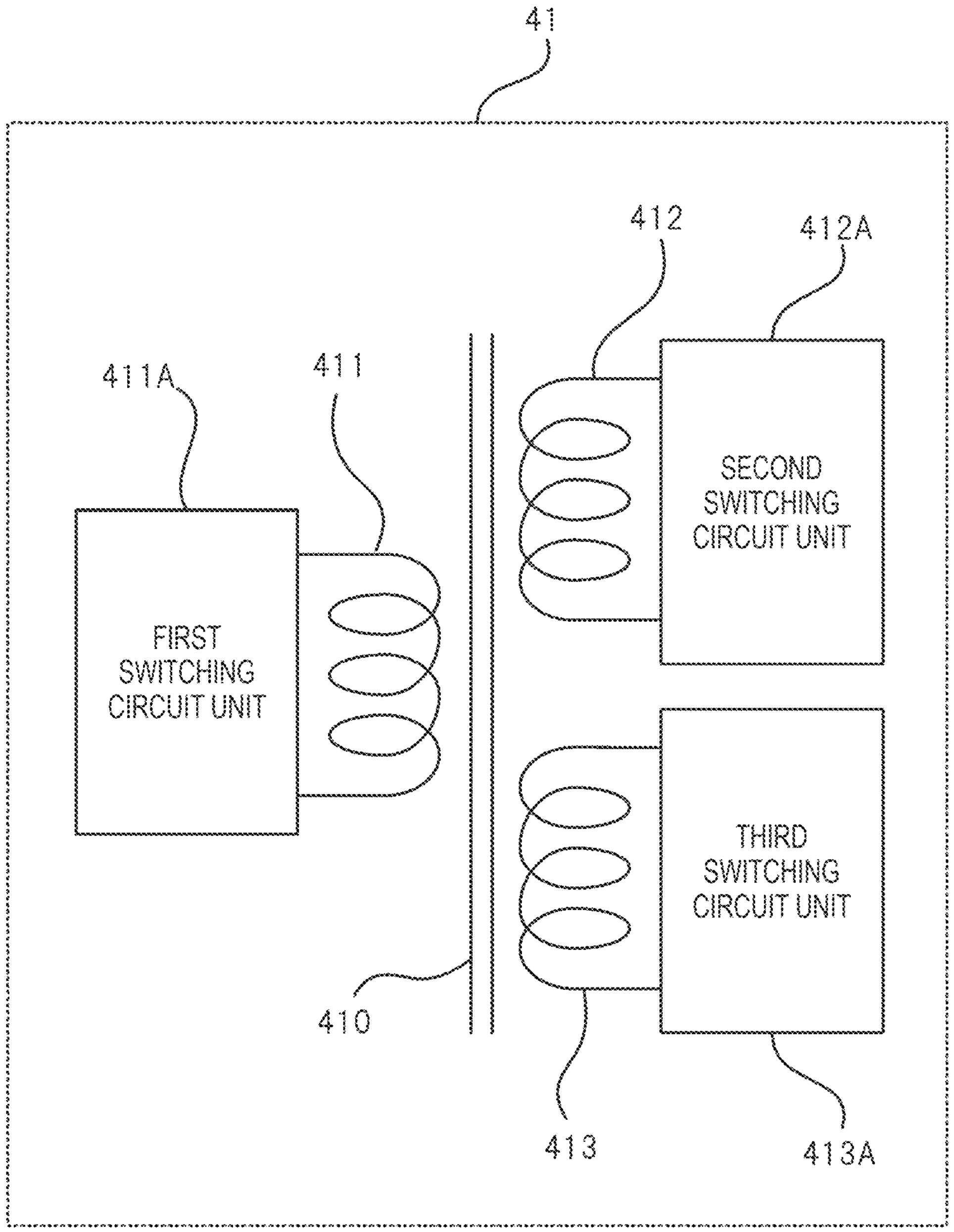
FIG. 2 is a schematic diagram showing an internal configuration of a first DC/DC converter 41.

FIG. 2 is a schematic diagram showing an internal configuration of the first DC/DC converter 41. Since the internal configuration of the second DC/DC converter 42 is the same as that of the first DC/DC converter 41, the description thereof will be partially omitted.

As shown in FIG. 2, the first DC/DC converter 41 is a power conversion circuit including an insulated multiport transformer 410. The multiport transformer 410 is a transformer having three or more (three in the shown example) input and output terminals. The multiport transformer 410 includes three or more coils (three coils, including a coil 411, a coil 412, and a coil 413 in the shown example) magnetically coupled to one another.

The first DC/DC converter 41 includes a first switching circuit unit 411A connected to the coil 411, a second switching circuit unit 412A connected to the coil 412, and a third switching circuit unit 413A connected to the coil 413.

The first switching circuit unit 411A is connected to the input and output terminal 41A (the input and output terminal 42A in the case of the second DC/DC converter 42) shown in FIG. 1. The second switching circuit unit 412A is connected to the input and output terminal 41B (the input and output terminal 42B in the case of the second DC/DC converter 42) shown in FIG. 1. The third switching circuit unit 413A is connected to the input and output terminal 41C (the input and output terminal 42C in the case of the second DC/DC converter 42) shown in FIG. 1.

Each of the first switching circuit unit 411A, the second switching circuit unit 412A, and the third switching circuit unit 413A may be implemented by a switching element such as a MOSFET, an IGBT, or a diode having a switching function. Each of the first switching circuit unit 411A, the second switching circuit unit 412A, and the third switching circuit unit 413A includes, for example, a bridge circuit or a half-bridge circuit. A part of the first switching circuit unit 411A, the second switching circuit unit 412A, and the third switching circuit unit 413A may include a bridge circuit, and the rest may include a half-bridge circuit.

Each of the first DC/DC converter 41 and the second DC/DC converter 42 can operate in a first mode, a second mode, and a third mode. Hereinafter, each mode of the first DC/DC converter 41 will be described. Since each mode of the second DC/DC converter 42 is the same as that of the first DC/DC converter 41, the description thereof will be omitted.

Figure 3:
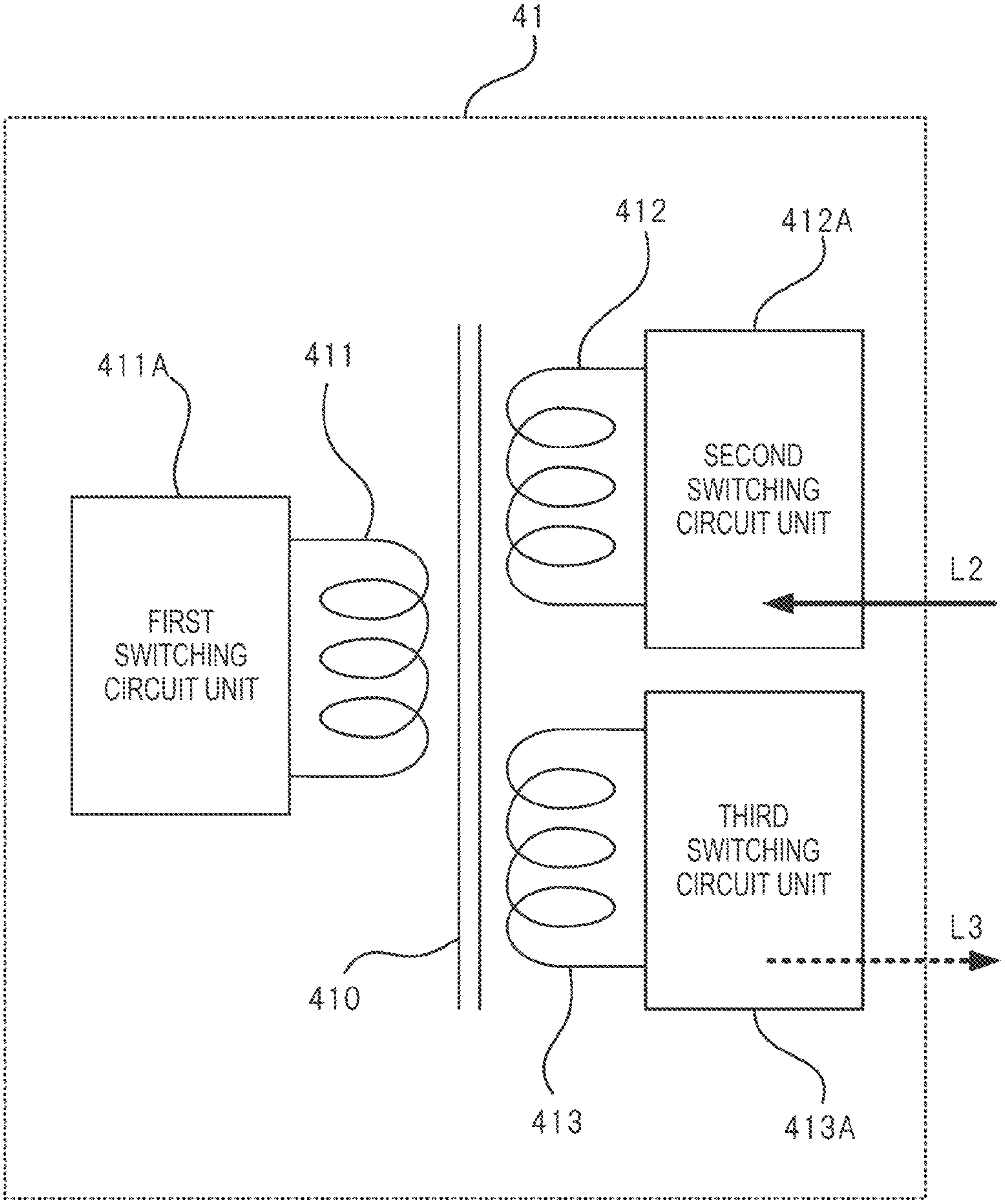
FIG. 3 is a diagram showing a flow of electric power of the first DC/DC converter 41 when operating in a first mode.

FIG. 3 is a diagram showing a flow of electric power of the first DC/DC converter 41 when operating in the first mode. As shown in FIG. 3, in the first mode, the first DC/DC converter 41 converts a voltage of the second level L2 received in the input and output terminal 41B into a voltage of the third level L3 by the coil 412, the second switching circuit unit 412A, the coil 413 and the third switching circuit unit 413A, and outputs the converted voltage from the input and output terminal 41C.

Figure 4:
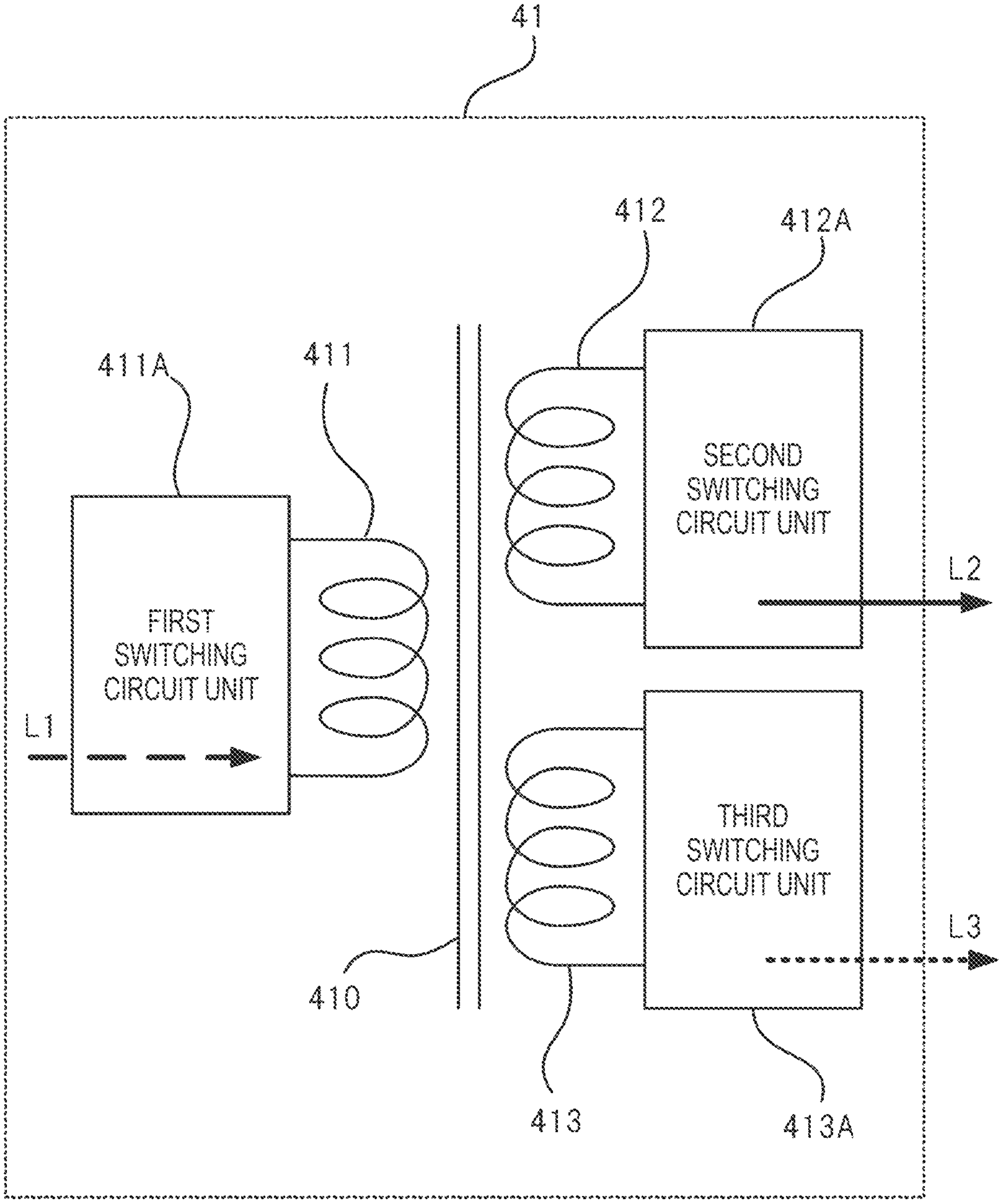
FIG. 4 is a diagram showing a flow of the electric power of the first DC/DC converter 41 when operating in a second mode.

FIG. 4 is a diagram showing a flow of the electric power of the first DC/DC converter 41 when operating in the second mode. As shown in FIG. 4, in the second mode, the first DC/DC converter 41 converts a voltage of the first level L1 received in the input and output terminal 41A into a voltage of the second level L2 by the coil 411, the first switching circuit unit 411A, the coil 412 and the second switching circuit unit 412A, and outputs the converted voltage from the input and output terminal 41B. Further, the first DC/DC converter 41 converts a voltage of the first level L1 received in the input and output terminal 41A into a voltage of the third level L3 by the coil 411, the first switching circuit unit 411A, the coil 413 and the third switching circuit unit 413A, and outputs the converted voltage from the input and output terminal 41C.

Figure 5:
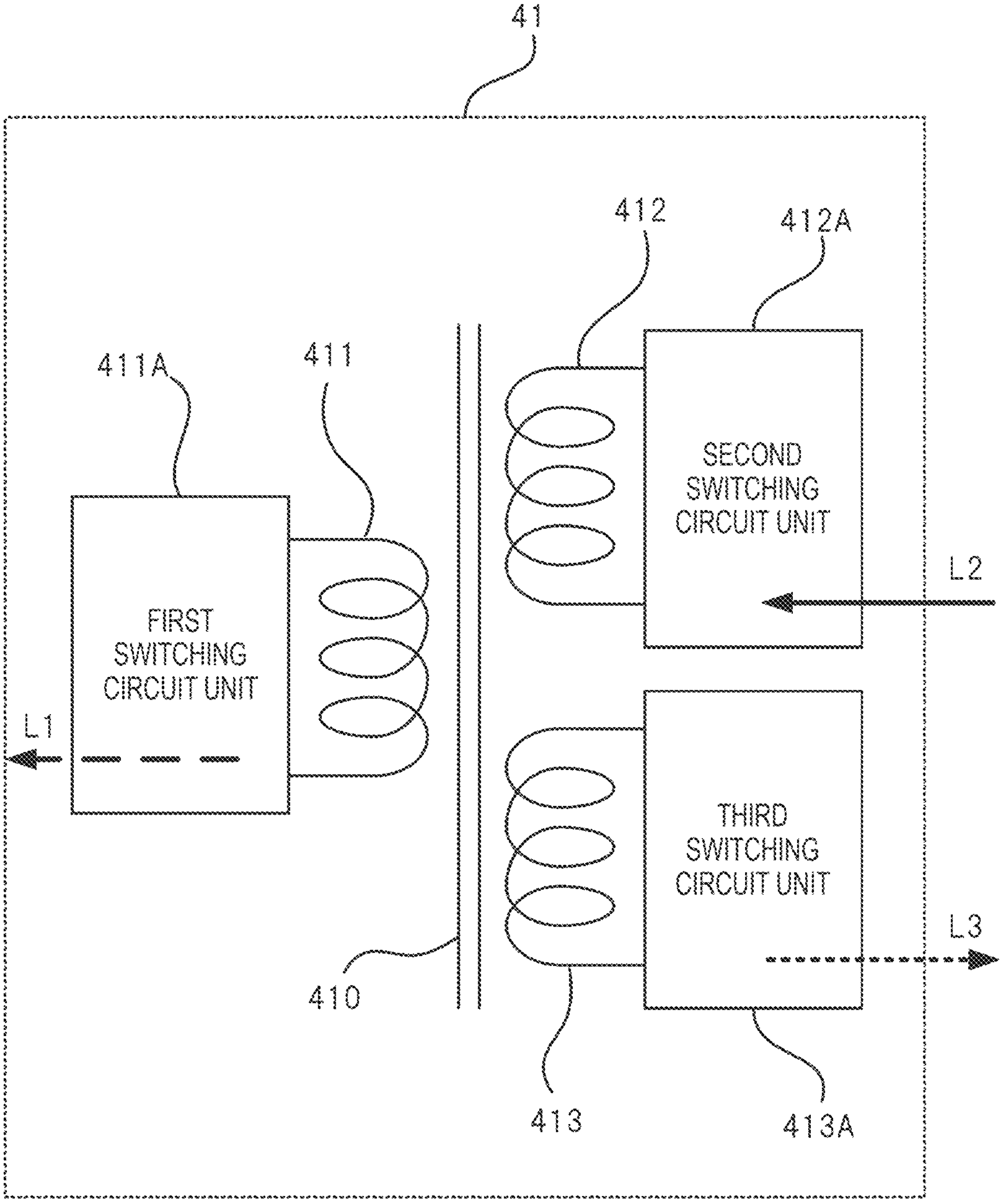
FIG. 5 is a diagram showing a flow of the electric power of the first DC/DC converter 41 when operating in a third mode.

FIG. 5 is a diagram showing a flow of the electric power of the first DC/DC converter 41 when operating in the third mode. As shown in FIG. 5, in the third mode, the first DC/DC converter 41 converts a voltage of the second level L2 received in the input and output terminal 41B into a voltage of the first level L1 by the coil 411, the first switching circuit unit 411A, the coil 412 and the second switching circuit unit 412A, and outputs the converted voltage from the input and output terminal 41A. Further, the first DC/DC converter 41 converts a voltage of the second level L2 received in the input and output terminal 41B into a voltage of the third level L3 by the coil 412, the second switching circuit unit 412A, the coil 413 and the third switching circuit unit 413A, and outputs the converted voltage from the input and output terminal 41C.

Figure 6:
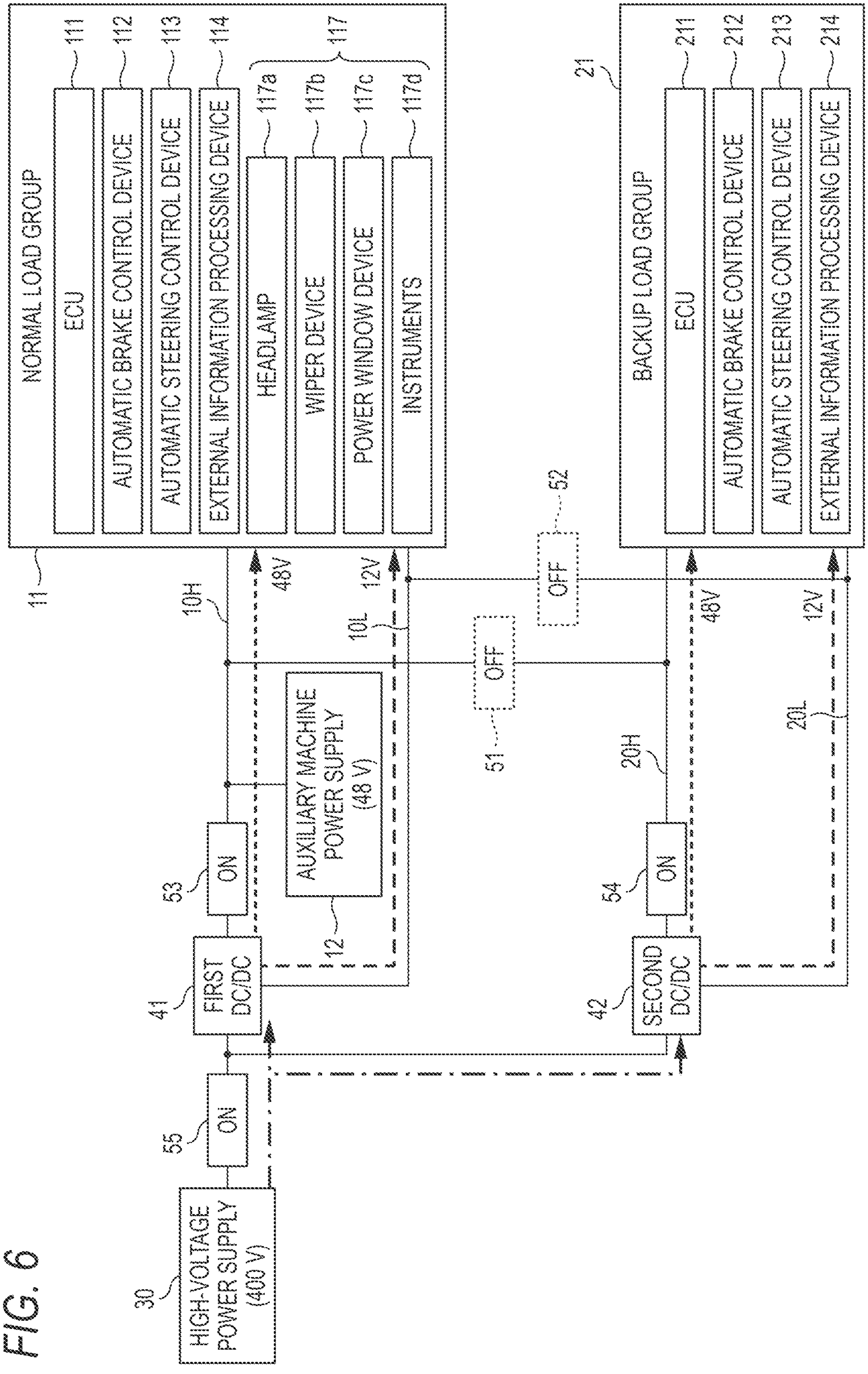
FIG. 6 is a diagram illustrating an operation of the power supply system 100 in a started-up state of a vehicle.

FIG. 6 is a diagram illustrating an operation of the power supply system 100 in a started-up state of the vehicle. The started-up state of the vehicle refers to, for example, a state in which electric power is supplied to each load in the normal load group 11 and each load in the backup load group 21 shown in the figure, and traveling of the vehicle can be started by an accelerator operation. The non-started-up state of the vehicle refers to a state other than the state in which the traveling of the vehicle can be started by the accelerator operation, and refers to a state in which minimum necessary electric power is supplied to the normal load group 11 and the backup load group 21. The vehicle performs predetermined start-up processing when started up from the non-started-up state, and shifts to the started-up state when the start-up processing is completed.

As shown in FIG. 6, in the started-up state of the vehicle, the first switch 51 and the second switch 52 are controlled to an OFF state, and the third switch 53, the fourth switch 54, and the fifth switch 55 are controlled to an ON state. The first DC/DC converter 41 and the second DC/DC converter 42 each operate in the second mode (see FIG. 4).

In the started-up state of the vehicle, a voltage of the first level L1 from the high-voltage power supply 30 is stepped down by each of the first DC/DC converter 41 and the second DC/DC converter 42, and is converted into a voltage of the second level L2 and a voltage of the third level L3. Then, the voltage of the second level L2 converted by the first DC/DC converter 41 is supplied to the high-voltage load in the normal load group 11 via the high-voltage power supply line 10H, and the voltage of the third level L3 converted by the first DC/DC converter 41 is supplied to the low-voltage load in the normal load group 11 via the low-voltage power supply line 10L. Further, the voltage of the second level L2 converted by the second DC/DC converter 42 is supplied to the high-voltage load in the backup load group 21 via the high-voltage power supply line 20H, and the voltage of the third level L3 converted by the second DC/DC converter 42 is supplied to the low-voltage load in the backup load group 21 via the low-voltage power supply line 20L.

When the electric power supplied in the high-voltage power supply line 10H is insufficient for the electric power to be supplied to the high-voltage load in the normal load group 11, the electric power of the auxiliary machine power supply 12 is supplied to the high-voltage load via the high-voltage power supply line 10H.

In this way, since the electric power is supplied to the normal load group 11 and the backup load group 21 in the started-up state of the vehicle, even when the power supply to one of the normal load group 11 and the backup load group 21 is interrupted, the power supply to the other can be continued. Therefore, even when the vehicle is traveling by autonomous driving, the vehicle can be safely stopped.

Figure 7:
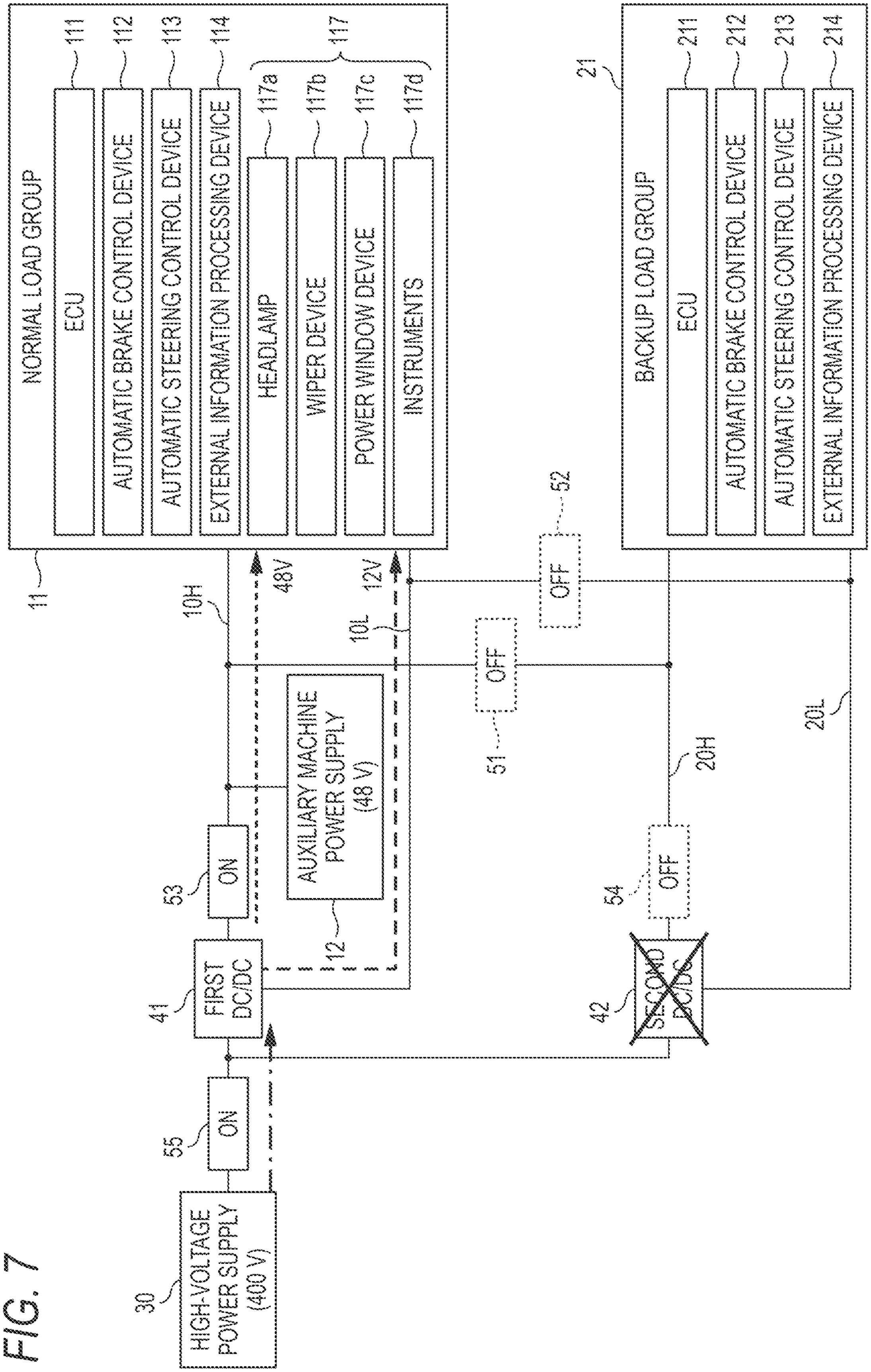
FIG. 7 is a diagram illustrating a flow of the electric power when an abnormality occurs in a second DC/DC converter 42, and appropriate electric power conversion in the second DC/DC converter 42 becomes impossible in the normally started-up state shown in FIG. 6.

FIG. 7 is a diagram illustrating a flow of the electric power when an abnormality occurs in the second DC/DC converter 42, and appropriate electric power conversion in the second DC/DC converter 42 becomes impossible in the started-up state shown in FIG. 6. In this case, the second DC/DC converter 42 is stopped, and the fourth switch 54 is controlled to the OFF state. The fourth switch 54 may remain in the ON state. On the other hand, the first DC/DC converter 41 continues to operate in the second mode as in the case of FIG. 6. Therefore, the supply of the voltage of the second level L2 and the voltage of the third level L3 to the normal load group 11 is continued.

Figure 8:
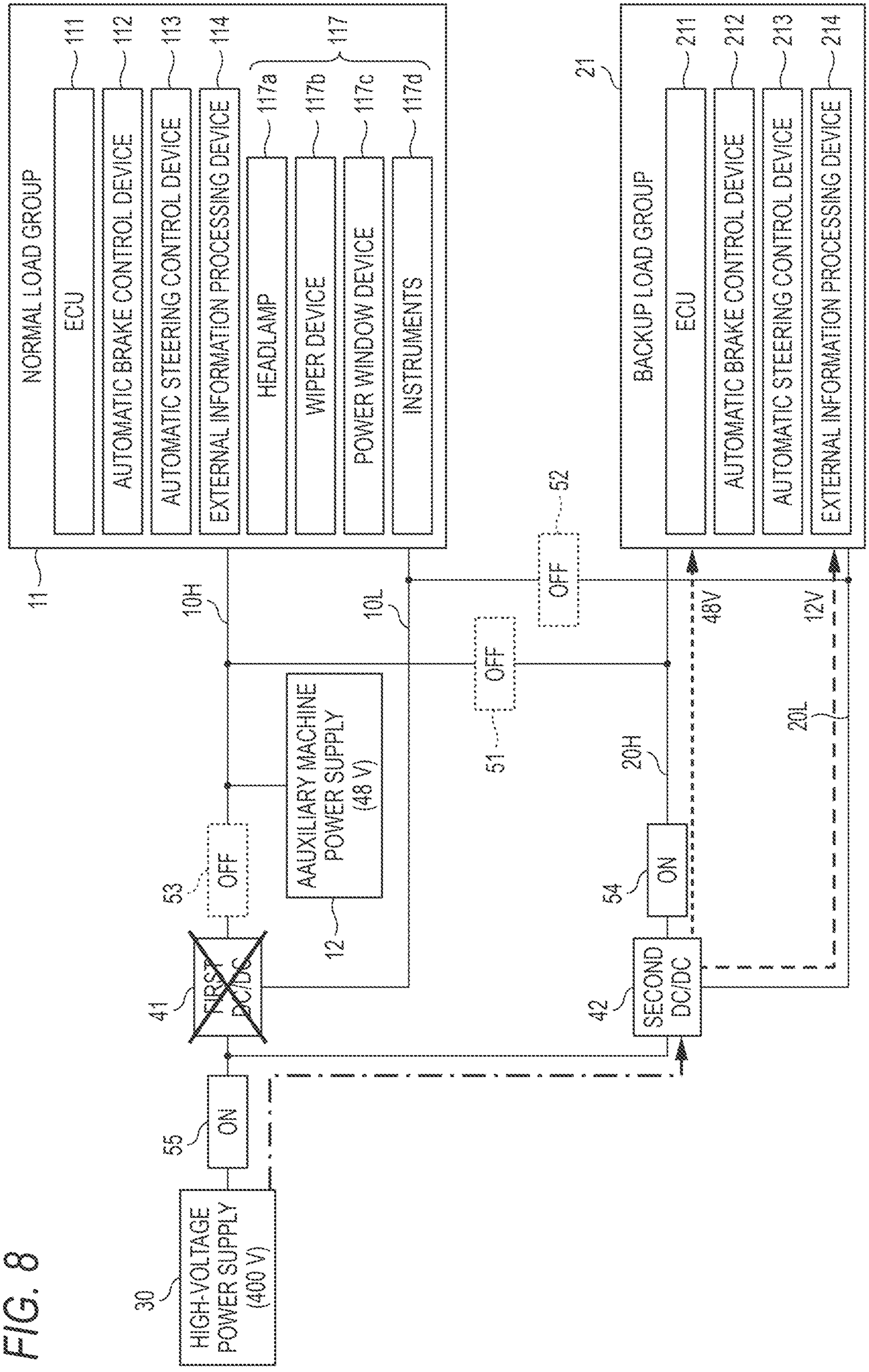
FIG. 8 is a diagram illustrating a flow of the electric power when an abnormality occurs in a first DC/DC converter 41, and appropriate electric power conversion in the first DC/DC converter 41 becomes impossible in the normally started-up state shown in FIG. 6.

FIG. 8 is a diagram illustrating a flow of the electric power when an abnormality occurs in the first DC/DC converter 41, and appropriate electric power conversion in the first DC/DC converter 41 becomes impossible in the started-up state shown in FIG. 6. In this case, the first DC/DC converter 41 is stopped, and the third switch 53 is controlled to the OFF state. The third switch 53 may remain in the ON state. On the other hand, the second DC/DC converter 42 continues to operate in the second mode as in the case of FIG. 6. Therefore, the supply of the voltage of the second level L2 and the voltage of the third level L3 to the backup load group 21 is continued.

Figure 9:
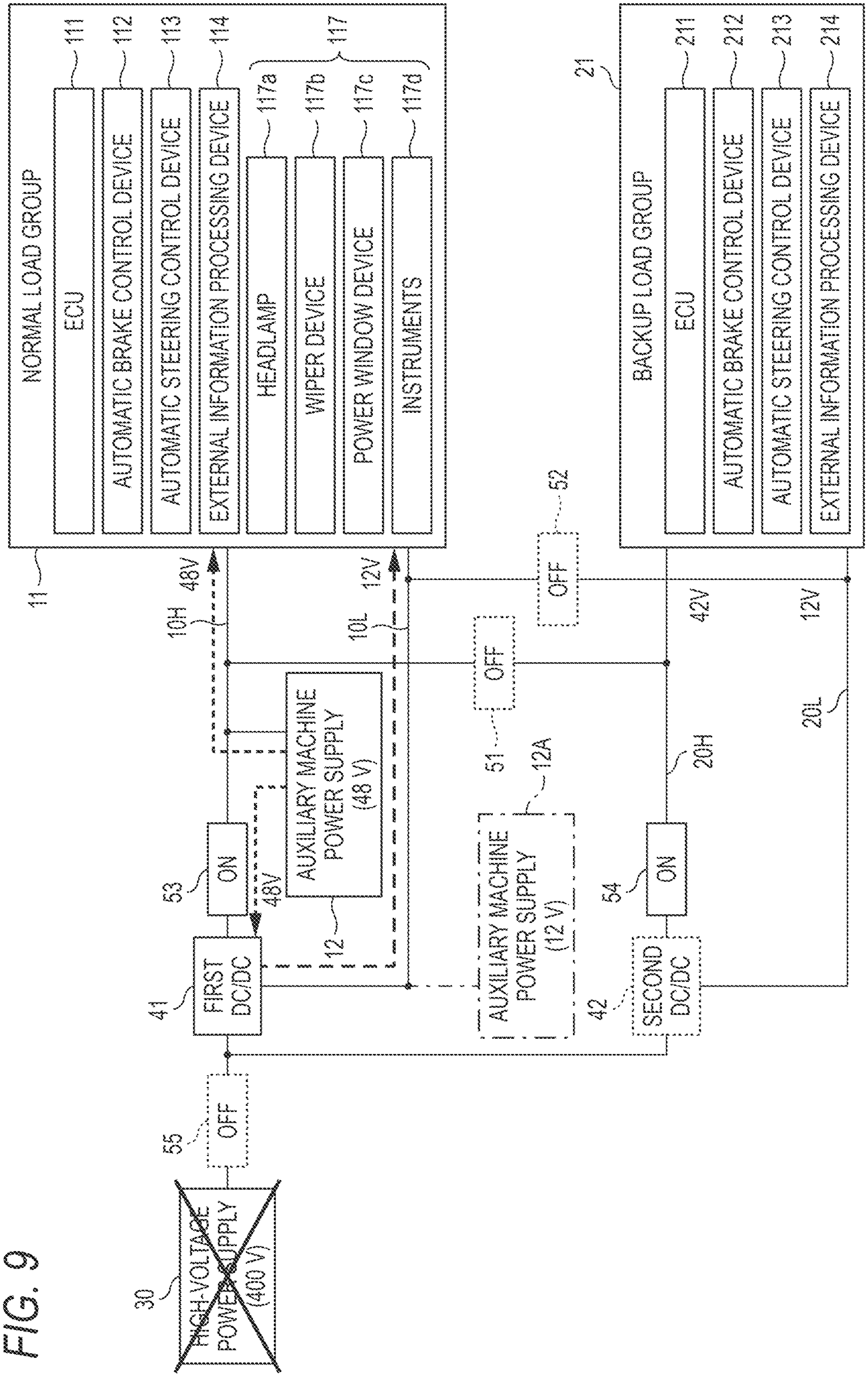
FIG. 9 is a diagram illustrating a flow of the power when an abnormality occurs in a high-voltage power supply 30 and appropriate electric power cannot be supplied from the high-voltage power supply 30 in the normally started-up state shown in FIG. 6.

FIG. 9 is a diagram illustrating a flow of the power when an abnormality occurs in the high-voltage power supply 30 and appropriate electric power cannot be supplied from the high-voltage power supply 30 in the started-up state shown in FIG. 6. In this case, the fifth switch 55 is controlled to the OFF state. Further, the second DC/DC converter 42 is stopped. On the other hand, the first DC/DC converter 41 switches from the second mode to the first mode (see FIG. 3).

When the first DC/DC converter 41 operates in the first mode, a voltage of the second level L2 is supplied from the auxiliary machine power supply 12 to the high-voltage load in the normal load group 11 via the high-voltage power supply line 10H. Further, the voltage of the second level L2 is supplied from the auxiliary machine power supply 12 to the first DC/DC converter 41, and the voltage is converted into a voltage of the third level L3 by the first DC/DC converter 41. The voltage of the third level L3 output from the first DC/DC converter 41 is supplied to the low-voltage load in the normal load group 11 via the low-voltage power supply line 10L.

Figure 10:
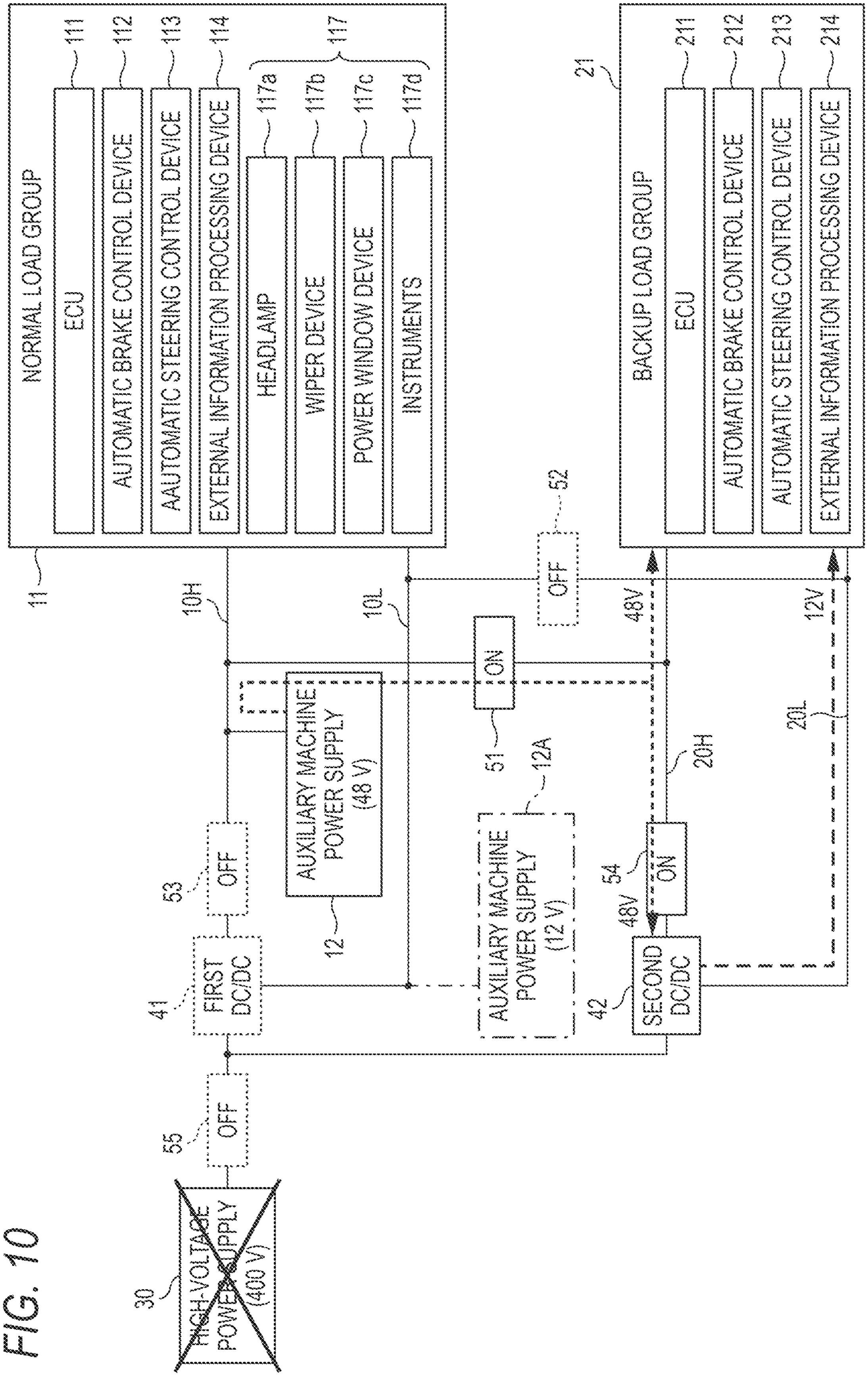
FIG. 10 is a diagram illustrating another example of the flow of the power when an abnormality occurs in the high-voltage power supply 30 and appropriate electric power cannot be supplied from the high-voltage power supply 30 in the normally started-up state shown in FIG. 6.

FIG. 10 is a diagram illustrating another example of the flow of the power when an abnormality occurs in the high-voltage power supply 30 and appropriate electric power cannot be supplied from the high-voltage power supply 30 in the started-up state shown in FIG. 6. In the example of FIG. 10, the fifth switch 55 and the third switch 53 are controlled to the OFF state, and the first switch 51 is controlled to the ON state. Further, the first DC/DC converter 41 is stopped. The third switch 53 may be controlled to the ON state. On the other hand, the second DC/DC converter 42 switches from the second mode to the first mode.

When the second DC/DC converter 42 operates in the first mode, a voltage of the second level L2 is supplied from the auxiliary machine power supply 12 to the high-voltage load in the backup load group 21 via the high-voltage power supply line 10H, the first switch 51, and the high-voltage power supply line 20H. The voltage of the second level L2 supplied from the auxiliary machine power supply 12 to the high-voltage power supply line 20H is input to the second DC/DC converter 42, and is converted into a voltage of the third level L3. The voltage of the third level L3 output from the second DC/DC converter 42 is supplied to the low-voltage load in the backup load group 21 via the low-voltage power supply line 20L.

As shown in FIGS. 9 and 10, according to the power supply system 100, even when an abnormality occurs in the high-voltage power supply 30, the power supply to either the normal load group 11 or the backup load group 21 can be continued using the auxiliary machine power supply 12. Since only one auxiliary machine power supply 12 is required, manufacturing costs of the power supply system 100 can be reduced.

Figure 11:
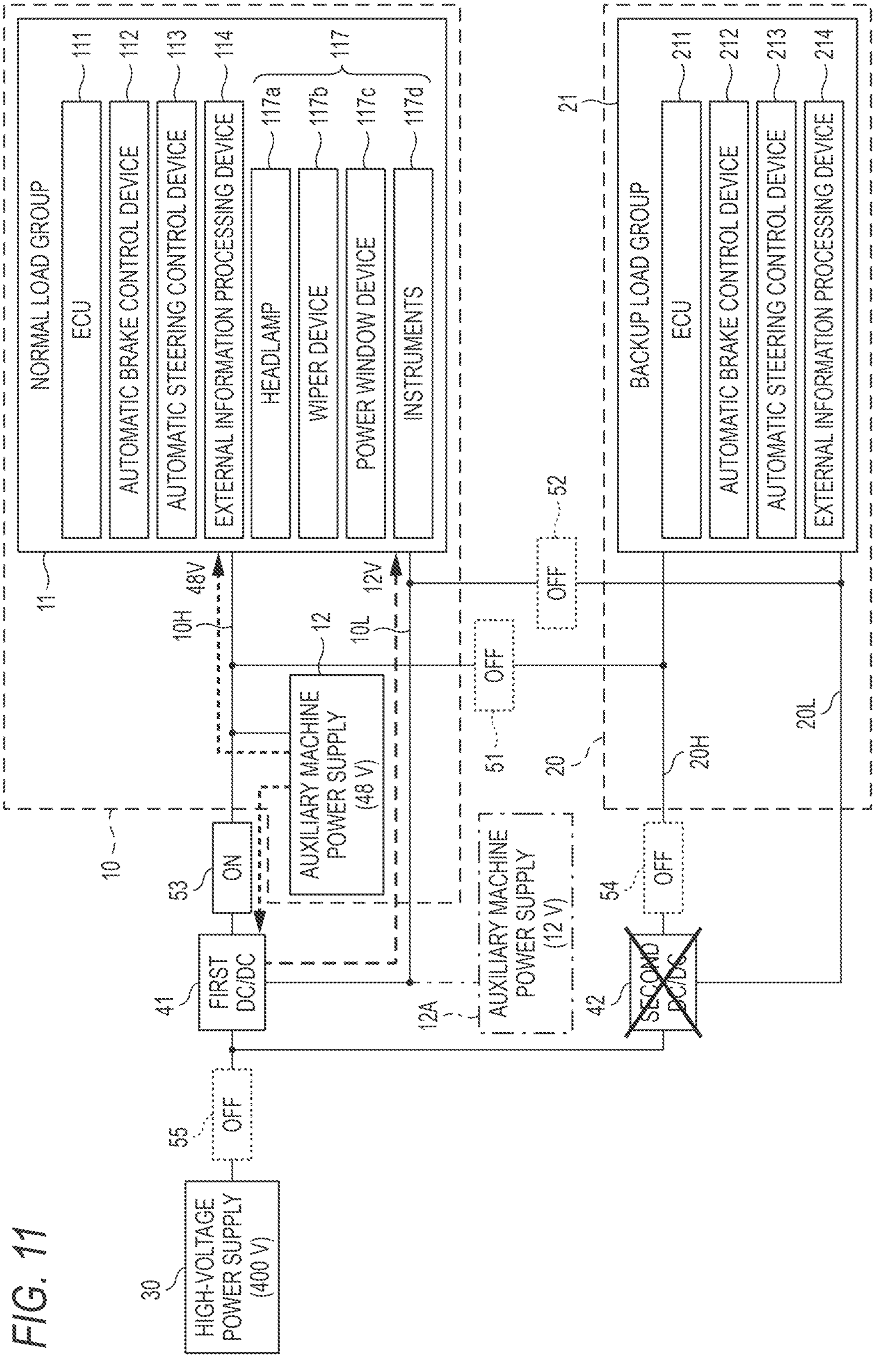
FIG. 11 is a diagram illustrating a flow of the electric power when a short circuit occurs in the second DC/DC converter 42 in the normally started-up state shown in FIG. 6.

FIG. 11 is a diagram illustrating a flow of the electric power when a short circuit occurs in the second DC/DC converter 42 in the started-up state shown in FIG. 6. In this case, the fourth switch 54 and the fifth switch 55 are controlled to the OFF state. The first DC/DC converter 41 switches from the second mode to the first mode.

When the first DC/DC converter 41 operates in the first mode, a voltage of the second level L2 is supplied from the auxiliary machine power supply 12 to the high-voltage load in the normal load group 11 and the first DC/DC converter 41 via the high-voltage power supply line 10H. The voltage of the second level L2 input to the first DC/DC converter 41 is converted into a voltage of the third level L3. The voltage of the third level L3 is supplied to the low-voltage load in the normal load group 11 via the low-voltage power supply line 10L.

Figure 12:
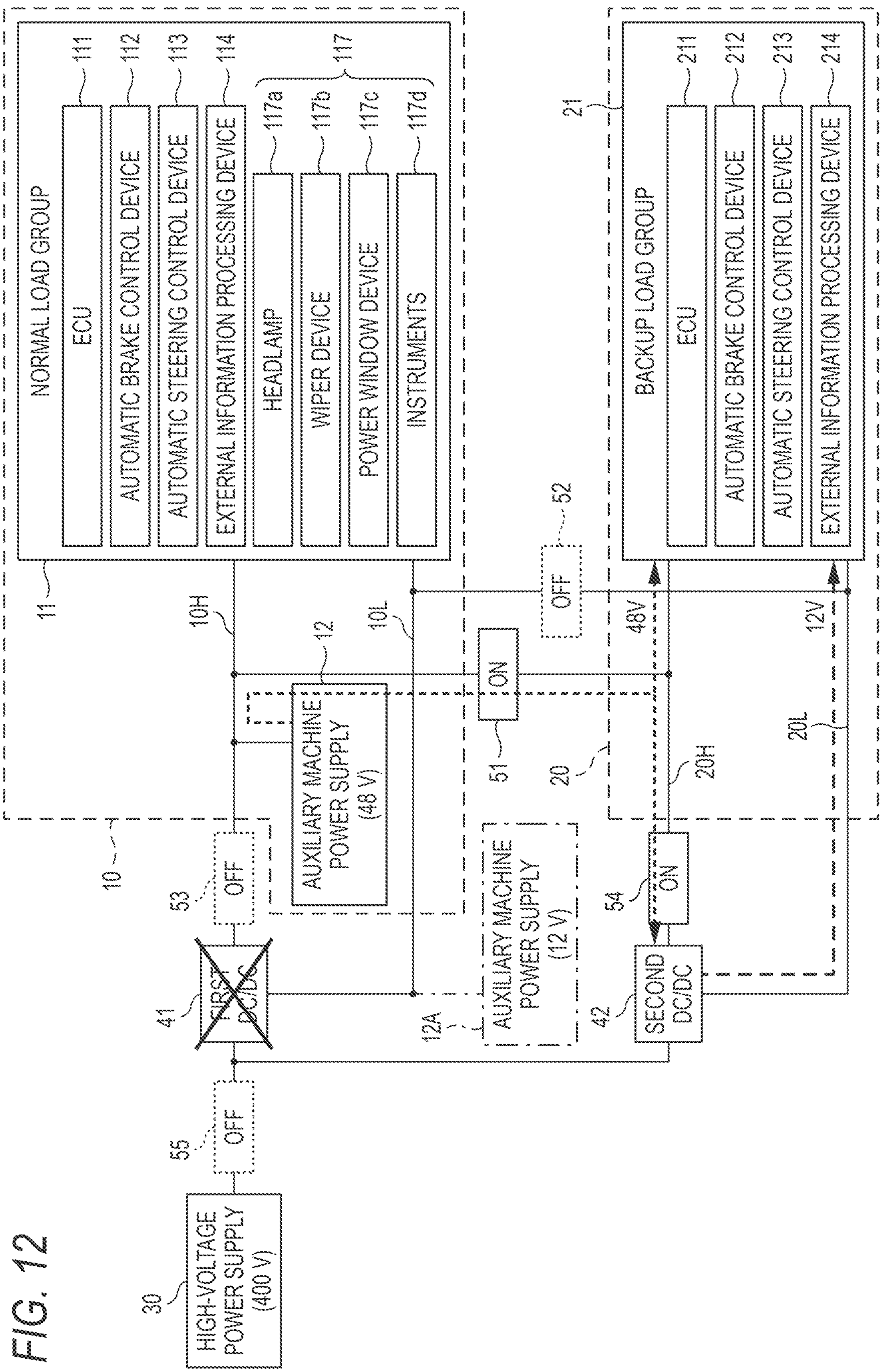
FIG. 12 is a diagram illustrating a flow of the electric power when a short circuit occurs in the first DC/DC converter 41 in the normally started-up state shown in FIG. 6.

FIG. 12 is a diagram illustrating a flow of the electric power when a short circuit occurs in the first DC/DC converter 41 in the started-up state shown in FIG. 6. In this case, the third switch 53 and the fifth switch 55 are controlled to the OFF state, and the first switch 51 is controlled to the ON state. Then, the second DC/DC converter 42 is switched from the second mode to the first mode.

When the second DC/DC converter 42 operates in the first mode, a voltage of the second level L2 is supplied from the auxiliary machine power supply 12 to the high-voltage load in the backup load group 21 and the second DC/DC converter 42 via the high-voltage power supply line 10H, the first switch 51, and the high-voltage power supply line 20H. The voltage of the second level L2 input to the second DC/DC converter 42 is converted into a voltage of the third level L3. The voltage of the third level L3 is supplied to the low-voltage load in the backup load group 21 via the low-voltage power supply line 20L.

As shown in FIGS. 11 and 12, according to the power supply system 100, even when a short circuit occurs in the first DC/DC converter 41 or the second DC/DC converter 42, the power supply to either the normal load group 11 or the backup load group 21 can be continued using the auxiliary machine power supply 12. Since only one auxiliary machine power supply 12 is required, the manufacturing costs of the power supply system 100 can be reduced.

As shown in FIGS. 9 to 12, when a state in which the electric power is supplied to the normal load group 11 and the backup load group 21 using the high-voltage power supply 30 transitions to a state in which the high-voltage power supply 30 cannot be used, it is necessary for the first DC/DC converter 41 or the second DC/DC converter 42 to switch from the second mode to the first mode. When the switching takes time, it is effective to connect an auxiliary machine power supply 12A to the low-voltage power supply line 10L as shown in FIGS. 9 to 12. The auxiliary machine power supply 12A can output a voltage of the third level L3, and can be manufactured at a lower cost than the auxiliary machine power supply 12.

According to the examples of FIGS. 9 and 11, a voltage of the second level L2 can be supplied from the auxiliary machine power supply 12A to the low-voltage load in the normal load group 11 during a period until the first DC/DC converter 41 is switched from the second mode to the first mode. Therefore, when it takes time to switch the mode of the first DC/DC converter 41, an instantaneous interruption of electric power to the low-voltage load in the normal load group 11 can be avoided.

According to the examples of FIGS. 10 and 12, by controlling the second switch 52 to the ON state only during a period until the second DC/DC converter 42 is switched from the second mode to the first mode, a voltage of the second level L2 can be supplied from the auxiliary machine power supply 12A to the low-voltage load in the backup load group 21. Therefore, when it takes time to switch the mode of the second DC/DC converter 42, an instantaneous interruption of electric power to the low-voltage load in the backup load group 21 can be avoided.

As described above, it is effective to provide the auxiliary machine power supply 12A. Since the electric power of the auxiliary machine power supply 12A is used only temporarily, the auxiliary machine power supply 12A can be configured at low costs. Therefore, even when the auxiliary machine power supply 12A is added, the manufacturing costs of the power supply system 100 can be reduced as compared with, for example, a case where two auxiliary machine power supplies 12 are provided.

Figure 13:
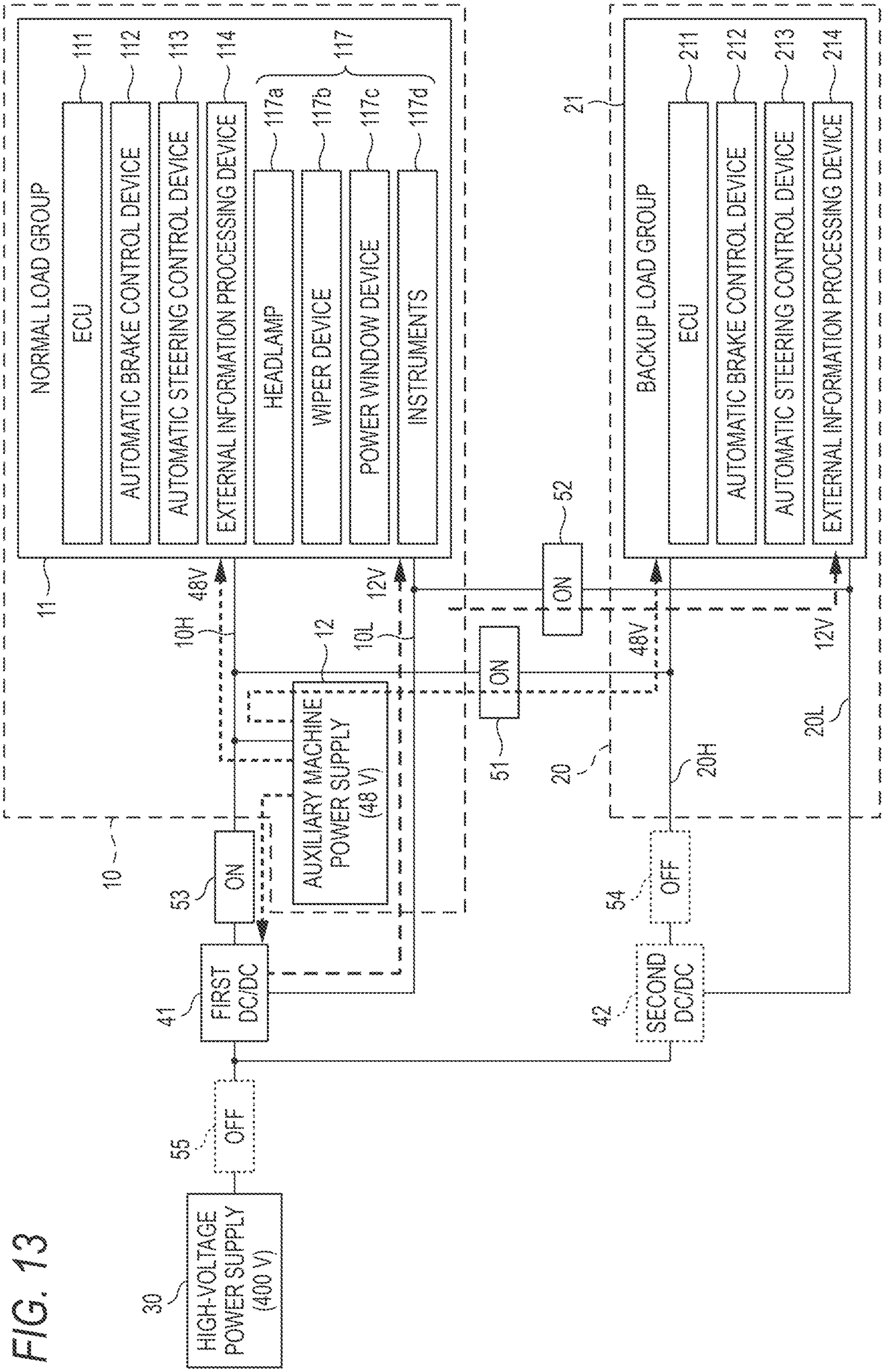
FIG. 13 is a diagram illustrating a flow of the electric power in a non-started-up state of the vehicle.

FIG. 13 is a diagram illustrating a flow of the electric power in a non-started-up state of the vehicle. In the non-started-up state of the vehicle, the first switch 51, the second switch 52, and the third switch 53 are controlled to the ON state, and the fourth switch 54 and the fifth switch 55 are controlled to the OFF state. Further, the second DC/DC converter 42 is stopped. Then, the first DC/DC converter 41 operates in the first mode.

When the first DC/DC converter 41 operates in the first mode, a voltage of the second level L2 is supplied from the auxiliary machine power supply 12 to the high-voltage load in the normal load group 11 and the first DC/DC converter 41 via the high-voltage power supply line 10H. The voltage of the second level L2 input to the first DC/DC converter 41 is converted into a voltage of the third level L3. The voltage of the third level L3 is supplied to the low-voltage load in the normal load group 11 via the low-voltage power supply line 10L, and is supplied to the low-voltage load in the backup load group 21 via the low-voltage power supply line 10L, the second switch 52, and the low-voltage power supply line 20L. Further, a voltage of the second level L2 is supplied from the auxiliary machine power supply 12 to the high-voltage load in the backup load group 21 via the high-voltage power supply line 10H, the first switch 51, and the high-voltage power supply line 20H.

In this way, in the non-started-up state of the vehicle, the voltage required to be supplied to the normal load group 11 and the backup load group 21 can be covered by the auxiliary machine power supply 12 alone, and the number of power supplies can be reduced. Further, even in a state where the second DC/DC converter 42 is stopped, since a voltage of the second level L2 and a voltage of the third level L3 can be supplied to the backup load group 21, the voltage can be efficiently supplied to the backup load group 21.

Figure 14:
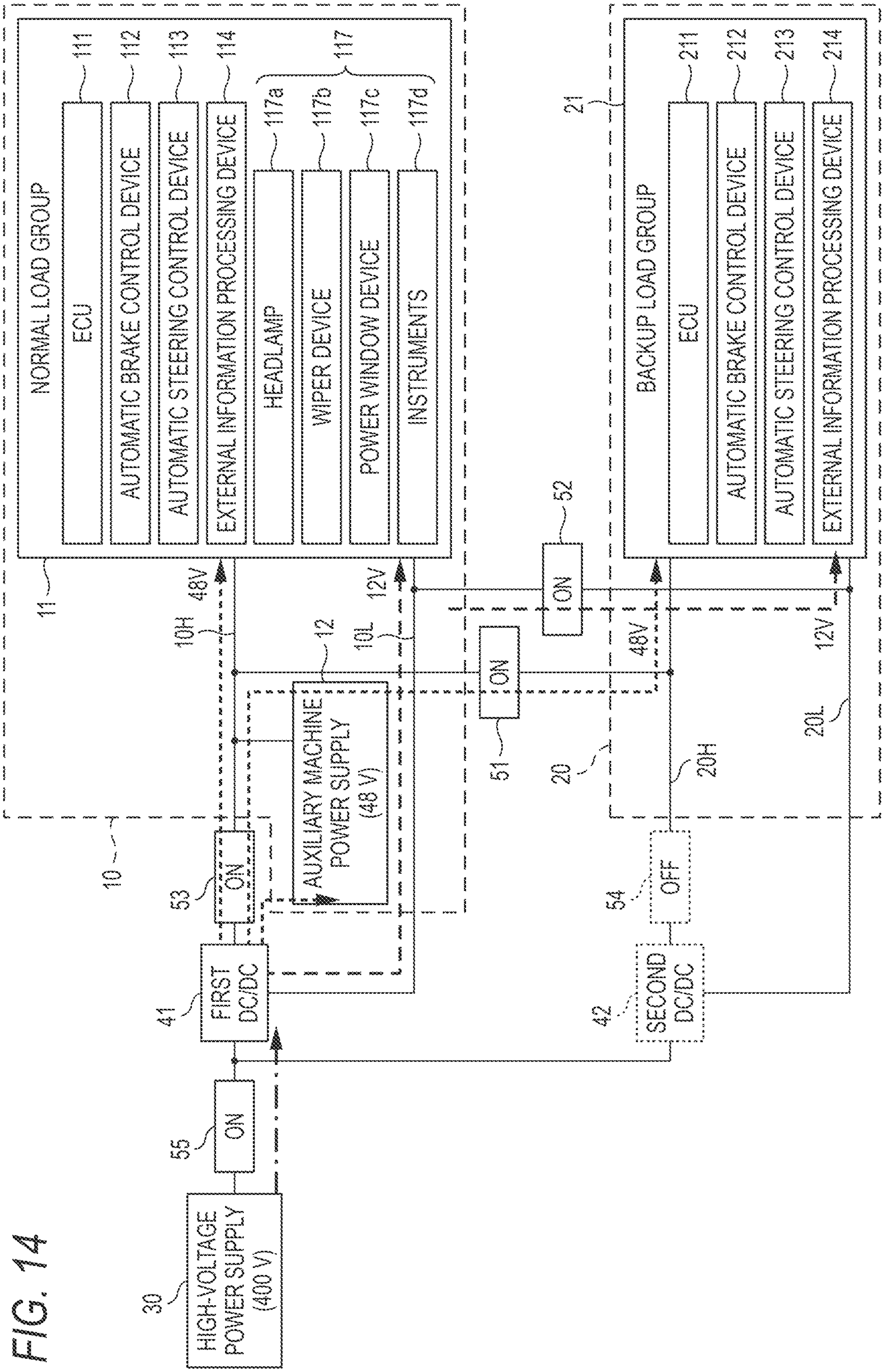
FIG. 14 is a diagram illustrating a flow of the electric power when a mode of the first DC/DC converter 41 is switched from the state shown in FIG. 13 to the second mode.

The first DC/DC converter 41 preferably operates by switching between the first mode and the second mode in the non-started-up state of the vehicle. FIG. 14 is a diagram illustrating a flow of the electric power when the mode of the first DC/DC converter 41 is switched from the state shown in FIG. 13 to the second mode. In this case, the fifth switch 55 is controlled to be in the ON state. Since the first DC/DC converter 41 operates in the second mode, a voltage of the second level L2 and a voltage of the third level L3 are generated from a voltage of the first level L1 supplied from the high-voltage power supply 30 to the first DC/DC converter 41.

The voltage of the second level L2 output from the first DC/DC converter 41 is supplied to the high-voltage load in the normal load group 11 via the high-voltage power supply line 10H, and is supplied to the high-voltage load in the backup load group 21 via the high-voltage power supply line 10H, the first switch 51, and the high-voltage power supply line 20H. Further, the auxiliary machine power supply 12 is charged by the voltage of the second level L2 output from the first DC/DC converter 41.

The voltage of the third level L3 output from the first DC/DC converter 41 is supplied to the low-voltage load in the normal load group 11 via the low-voltage power supply line 10L, and is supplied to the low-voltage load in the backup load group 21 via the low-voltage power supply line 10L, the second switch 52, and the low-voltage power supply line 20L.

When the auxiliary machine power supply 12 is sufficiently charged, the first DC/DC converter 41 is switched from the second mode to the first mode, and the fifth switch 55 is controlled to the OFF state to return to the state shown in FIG. 13. Then, the power supply to the normal load group 11 and the backup load group 21 can be performed by the charged auxiliary machine power supply 12. By charging the auxiliary machine power supply 12 in this way, it is possible to sufficiently secure the electric power of the auxiliary machine power supply 12 used in the states shown in FIGS. 9 to 13.

Figure 15:
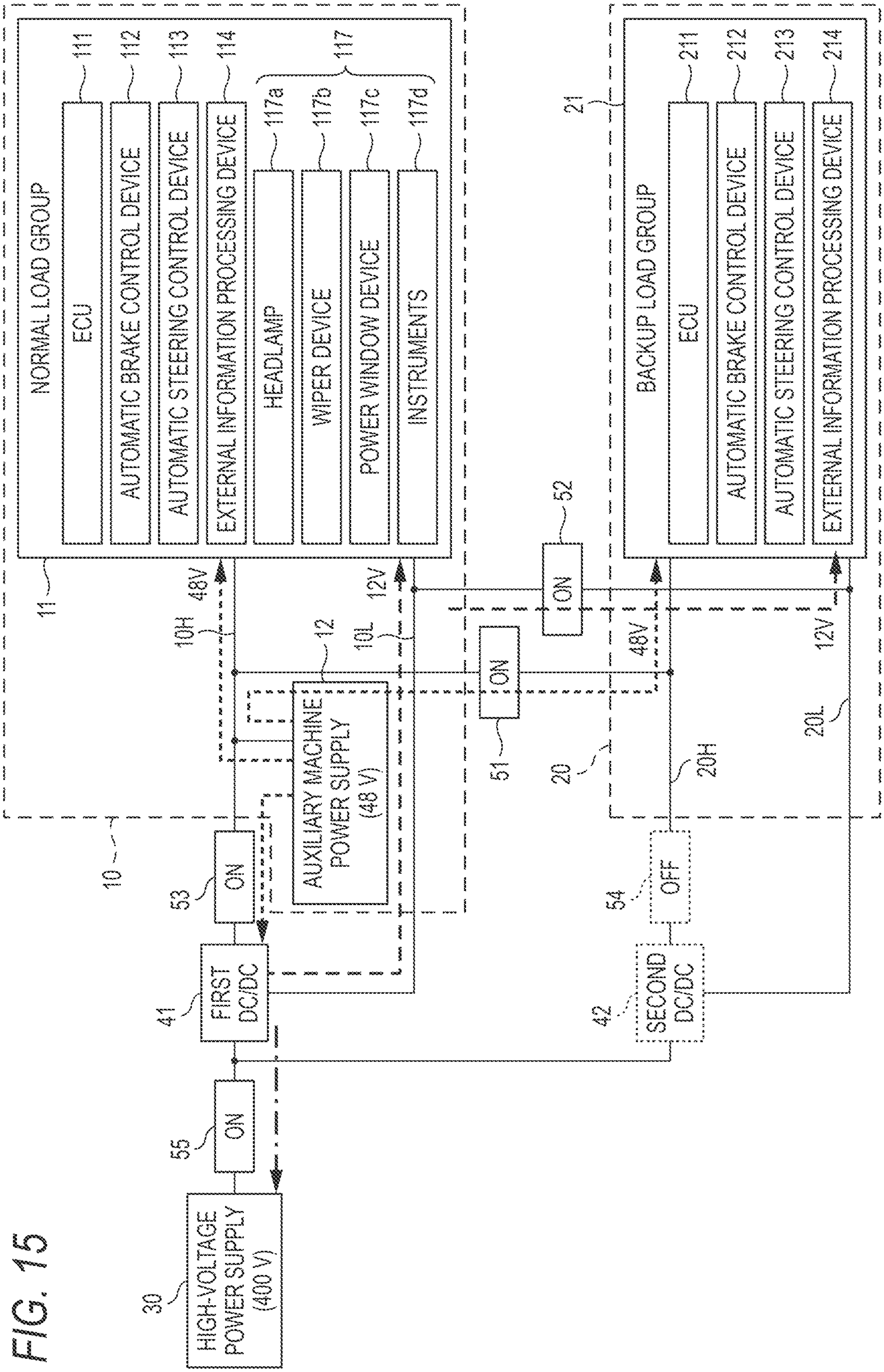
FIG. 15 is a diagram illustrating a flow of the electric power when the vehicle shifts from the non-started-up state to the started-up state.

FIG. 15 is a diagram illustrating a flow of the electric power when the vehicle shifts from the non-started-up state to the started-up state. When a start-up operation is performed in the state shown in FIG. 13, the fifth switch 55 is controlled to the ON state, and the first DC/DC converter 41 is switched from the first mode to the third mode (see FIG. 5). When the first DC/DC converter 41 is switched to the third mode, a voltage of the second level L2 from the auxiliary machine power supply 12 is boosted, output from the first DC/DC converter 41, and charged in a capacitor of the high-voltage power supply 30. Other electric power flows are the same as those described in FIG. 13. When the charging of the capacitor of the high-voltage power supply 30 is completed and the subsequent start-up processing is completed, the power supply system 100 enters the state (started-up state) shown in FIG. 6.

As described above, when the vehicle shifts from the non-started-up state to the started-up state, since the capacitor of the high-voltage power supply 30 can be charged with the electric power of the auxiliary machine power supply 12, a time required to end the start-up processing can be shortened, and high-speed start-up can be performed. Further, in a period in which the capacitor of the high-voltage power supply 30 is being charged, the voltage of the second level L2 and the voltage of the third level L3 can also be supplied to the normal load group 11 and the backup load group 21 as in the state of FIG. 13. Therefore, it is possible to prevent the minimum necessary power supply to the load from being interrupted.

Although an embodiment of the present disclosure has been described above with reference to the accompanying drawings, it is needless to say that the present invention is not limited to the embodiment. It is apparent to those skilled in the art that various changes or modifications can be conceived within the scope described in the claims, and it is understood that the changes or modifications naturally fall within the technical scope of the present invention. In addition, the constituent elements in the above embodiment may be freely combined without departing from the gist of the invention.

In the present description, at least the following matters are described. In the parentheses, the corresponding constituent elements and the like in the above embodiment are shown as an example, but the present invention is not limited thereto.

(1) A power supply system including:

a first power conversion circuit (first DC/DC converter 41); and a second power conversion circuit (second DC/DC converter 42), the first power conversion circuit and the second power conversion circuit being connected in parallel to a first power supply (high-voltage power supply 30) that is mounted on a vehicle and that outputs a voltage of a first level (first level L1: 400V), in which each of the first power conversion circuit and the second power conversion circuit is capable of converting a voltage of the first level into a voltage of a second level (second level L2: 48V) and a voltage of a third level (third level L3: 12V), and converting a voltage of the second level into a voltage of the third level, the voltage of the second level and the voltage of the third level output from the first power conversion circuit are capable of being supplied to a first load (normal load group 11) of the vehicle, the voltage of the second level and the voltage of the third level output from the second power conversion circuit are capable of being supplied to a second load (backup load group 21) of the vehicle, the power supply system further includes:

a first switch (second switch 51) configured to switch between connection and cutoff between a first power supply line (high-voltage power supply line 10H) connecting the first power conversion circuit and the first load and a second power supply line (high-voltage power supply line 20H) connecting the second power conversion circuit and the second load, the first power supply line and the second power supply line being power supply lines to be supplied with a voltage of the second level;

a second switch (second switch 52) configured to switch between connection and cutoff between a third power supply line (low-voltage power supply line 10L) connecting the first power conversion circuit and the first load and a fourth power supply line (low-voltage power supply line 20L) connecting the second power conversion circuit and the second load, the third power supply line and the fourth power supply line being power supply lines to be supplied with a voltage of the third level; and a second power supply (auxiliary machine power supply 12) connected to the first power supply line and configured to output a voltage of the second level, in a non-started-up state (FIG. 13) of the vehicle, the first power conversion circuit operates in a first mode in which the voltage of the second level supplied from the second power supply is converted into a voltage of the third level, the first switch and the second switch are each controlled to a connection state, the voltage of the second level output from the second power supply is supplied to the first load and the first power conversion circuit, the voltage of the second level output from the second power supply is supplied to the second load via the first switch, the voltage of the third level output from the first power conversion circuit is supplied to the first load, and the voltage of the third level output from the first power conversion circuit is supplied to the second load via the second switch.

According to (1), in the non-started-up state of the vehicle, voltages of two levels that need to be supplied to the first load and the second load can be covered by the second power supply alone, and the number of power supplies can be reduced. Further, even in a state in which the second power conversion circuit is stopped, since the voltage of the second level and the voltage of the third level can be supplied to the second load, the voltage can be efficiently supplied to the load.

(2) The power supply system according to (1), in which the second power conversion circuit is stopped in the non-started-up state of the vehicle.

According to (2), power consumption in the non-started-up state of the vehicle can be reduced.

(3) The power supply system according to (1) or (2), in which in the non-started-up state of the vehicle, the first power conversion circuit switches between a second mode in which the voltage of the first level output from the first power supply is converted into a voltage of the second level and a voltage of the third level, and the first mode, and in a case (FIG. 14) where the first power conversion circuit operates in the second mode, the voltage of the second level output from the first power conversion circuit is supplied to the first load, the voltage of the second level output from the first power conversion circuit is supplied to the second load via the first switch, the second power supply is charged by the voltage of the second level output from the first power conversion circuit, the voltage of the third level output from the first power conversion circuit is supplied to the first load, and the voltage of the third level output from the first power conversion circuit is supplied to the second load via the second switch.

According to (3), when the first power conversion circuit operates in the second mode, the second power supply can be charged by the first power supply, and the voltage of the second level and the voltage of the third level can be supplied to the first load and the second load using the voltage of the first power supply. Since the second power supply can be charged even in the non-started-up state, the voltage can be stably supplied to the first load and the second load in the non-started-up state of the vehicle.

(4) The power supply system according to any one of (1) to (3), in which in a case (FIG. 15) where the vehicle shifts from the non-started-up state to a started-up state, the first power conversion circuit operates in a third mode in which the voltage of the second level output from the second power supply is converted into a voltage of the first level and a voltage of the third level, and in a case where the first power conversion circuit operates in the third mode, the voltage of the third level output from the first power conversion circuit is supplied to the first load, the voltage of the third level output from the first power conversion circuit is supplied to the second load via the second switch, the voltage of the second level output from the second power supply is supplied to the first load, the voltage of the second level output from the second power supply is supplied to the second load via the first switch, and the voltage of the first level output from the first power conversion circuit is supplied to the first power supply.

According to (4), when the vehicle shifts from the non-started-up state to the started-up state, a capacitor of the first power supply can be charged by the second power supply, and thus a time until completion of the start-up can be shortened. In a shift period, the voltage of the second level and the voltage of the third level can also be supplied to the first load and the second load using the voltage of the second power supply.

(5) The power supply system according to any one of (1) to (4), in which in a case (FIG. 12) where the vehicle is in a started-up state and the first power conversion circuit is short-circuited, the first switch is controlled to the connection state, the voltage of the second level output from the second power supply is supplied to the second load and the second power conversion circuit via the first switch, the second power conversion circuit operates in the first mode, and the voltage of the third level output from the second power conversion circuit is supplied to the second load.

According to (5), even when the first power conversion circuit is short-circuited and the second power conversion circuit cannot generate the voltage of the second level and the voltage of the third level from the voltage of the first power supply, the voltage of the second level and the voltage of the third level be supplied from the second power supply to the second load via the first switch and the second power conversion circuit. Therefore, a function of the vehicle can be maintained by supplying a necessary voltage to the second load.

(6) The power supply system according to any one of (1) to (5), in which in a case (FIG. 11) where the vehicle is in a started-up state and the second power conversion circuit is short-circuited, the first switch and the second switch are controlled to a cutoff state, the voltage of the second level output from the second power supply is supplied to the first load and the first power conversion circuit, the first power conversion circuit operates in the first mode, and the voltage of the third level output from the first power conversion circuit is supplied to the first load.

According to (6), even when the second power conversion circuit is short-circuited and the first power conversion circuit cannot generate the voltage of the second level and the voltage of the third level from the voltage of the first power supply, the voltage of the second level can be supplied from the second power supply to the first load, and the voltage of the third level can be supplied from the second power supply to the first load via the first power conversion circuit. Therefore, the function of the vehicle can be maintained by supplying a necessary voltage to the first load.

(7) The power supply system according to any one of (1) to (6), in which in a case (FIG. 9) the vehicle is in a started-up state and a voltage is not able to be supplied from the first power supply to the first power conversion circuit and the second power conversion circuit, the first switch and the second switch are controlled to a cutoff state, the voltage of the second level output from the second power supply is supplied to the first load and the first power conversion circuit, the first power conversion circuit operates in the first mode, and the voltage of the third level output from the first power conversion circuit is supplied to the first load.

According to (7), even when the first power supply cannot be used, voltages of two levels can be supplied to the first load. Therefore, the function of the vehicle can be maintained by supplying a necessary voltage to the first load.

(8) The power supply system according to any one of (1) to (7), in which in a case (FIG. 10) where the vehicle is in a started-up state and a voltage is not able to be supplied from the first power supply to the first power conversion circuit and the second power conversion circuit, the first switch is controlled to the connection state, the voltage of the second level output from the second power supply is supplied to the second load and the second power conversion circuit via the first switch, the second power conversion circuit operates in the first mode, and the voltage of the third level output from the second power conversion circuit is supplied to the second load.

According to (8), even when the first power supply cannot be used, voltages of two levels can be supplied from the second power supply to the second load via the first switch and the second power conversion circuit. Therefore, the function of the vehicle can be maintained by supplying a necessary voltage to the second load.

What is claimed is:

1. A power supply system comprising:

a first power conversion circuit; and a second power conversion circuit, the first power conversion circuit and the second power conversion circuit being connected in parallel to a first power supply that is mounted on a vehicle and that outputs a voltage of a first level, wherein each of the first power conversion circuit and the second power conversion circuit is capable of converting a voltage of the first level into a voltage of a second level and a voltage of a third level, and converting a voltage of the second level into a voltage of the third level, the voltage of the second level and the voltage of the third level output from the first power conversion circuit are capable of being supplied to a first load of the vehicle, the voltage of the second level and the voltage of the third level output from the second power conversion circuit are capable of being supplied to a second load of the vehicle, the power supply system further comprises:

a first switch configured to switch between connection and cutoff between a first power supply line connecting the first power conversion circuit and the first load and a second power supply line connecting the second power conversion circuit and the second load, the first power supply line and the second power supply line being power supply lines to be supplied with a voltage of the second level;

a second switch configured to switch between connection and cutoff between a third power supply line connecting the first power conversion circuit and the first load and a fourth power supply line connecting the second power conversion circuit and the second load, the third power supply line and the fourth power supply line being power supply lines to be supplied with a voltage of the third level; and a second power supply connected to the first power supply line and configured to output a voltage of the second level, in a non-started-up state of the vehicle, the first power conversion circuit operates in a first mode in which the voltage of the second level supplied from the second power supply is converted into a voltage of the third level, the first switch and the second switch are each controlled to a connection state, the voltage of the second level output from the second power supply is supplied to the first load and the first power conversion circuit, the voltage of the second level output from the second power supply is supplied to the second load via the first switch, the voltage of the third level output from the first power conversion circuit is supplied to the first load, and the voltage of the third level output from the first power conversion circuit is supplied to the second load via the second switch.

2. The power supply system according to claim 1, wherein the second power conversion circuit is stopped in the non-started-up state of the vehicle.

3. The power supply system according to claim 2, wherein in the non-started-up state of the vehicle, the first power conversion circuit switches between a second mode in which the voltage of the first level output from the first power supply is converted into a voltage of the second level and a voltage of the third level, and the first mode, and in a case where the first power conversion circuit operates in the second mode, the voltage of the second level output from the first power conversion circuit is supplied to the first load, the voltage of the second level output from the first power conversion circuit is supplied to the second load via the first switch, the second power supply is charged by the voltage of the second level output from the first power conversion circuit, the voltage of the third level output from the first power conversion circuit is supplied to the first load, and the voltage of the third level output from the first power conversion circuit is supplied to the second load via the second switch.

4. The power supply system according to claim 3, wherein in a case where the vehicle shifts from the non-started-up state to a started-up state, the first power conversion circuit operates in a third mode in which the voltage of the second level output from the second power supply is converted into a voltage of the first level and a voltage of the third level, and in a case where the first power conversion circuit operates in the third mode, the voltage of the third level output from the first power conversion circuit is supplied to the first load, the voltage of the third level output from the first power conversion circuit is supplied to the second load via the second switch, the voltage of the second level output from the second power supply is supplied to the first load, the voltage of the second level output from the second power supply is supplied to the second load via the first switch, and the voltage of the first level output from the first power conversion circuit is supplied to the first power supply.

5. The power supply system according to claim 2, wherein in a case where the vehicle is in a started-up state and the first power conversion circuit is short-circuited, the first switch is controlled to the connection state, the voltage of the second level output from the second power supply is supplied to the second load and the second power conversion circuit via the first switch, the second power conversion circuit operates in the first mode, and the voltage of the third level output from the second power conversion circuit is supplied to the second load.

6. The power supply system according to claim 2, wherein in a case where the vehicle is in a started-up state and the second power conversion circuit is short-circuited, the first switch and the second switch are controlled to a cutoff state, the voltage of the second level output from the second power supply is supplied to the first load and the first power conversion circuit, the first power conversion circuit operates in the first mode, and the voltage of the third level output from the first power conversion circuit is supplied to the first load.

7. The power supply system according to claim 2, wherein in a case where the vehicle is in a started-up state and a voltage is not able to be supplied from the first power supply to the first power conversion circuit and the second power conversion circuit, the first switch and the second switch are controlled to a cutoff state, the voltage of the second level output from the second power supply is supplied to the first load and the first power conversion circuit, the first power conversion circuit operates in the first mode, and the voltage of the third level output from the first power conversion circuit is supplied to the first load.

8. The power supply system according to claim 2, wherein in a case where the vehicle is in a started-up state and a voltage is not able to be supplied from the first power supply to the first power conversion circuit and the second power conversion circuit, the first switch is controlled to the connection state, the voltage of the second level output from the second power supply is supplied to the second load and the second power conversion circuit via the first switch, the second power conversion circuit operates in the first mode, and the voltage of the third level output from the second power conversion circuit is supplied to the second load.

* * * * *